United States Patent Office 3,323,634
Patented June 6, 1967

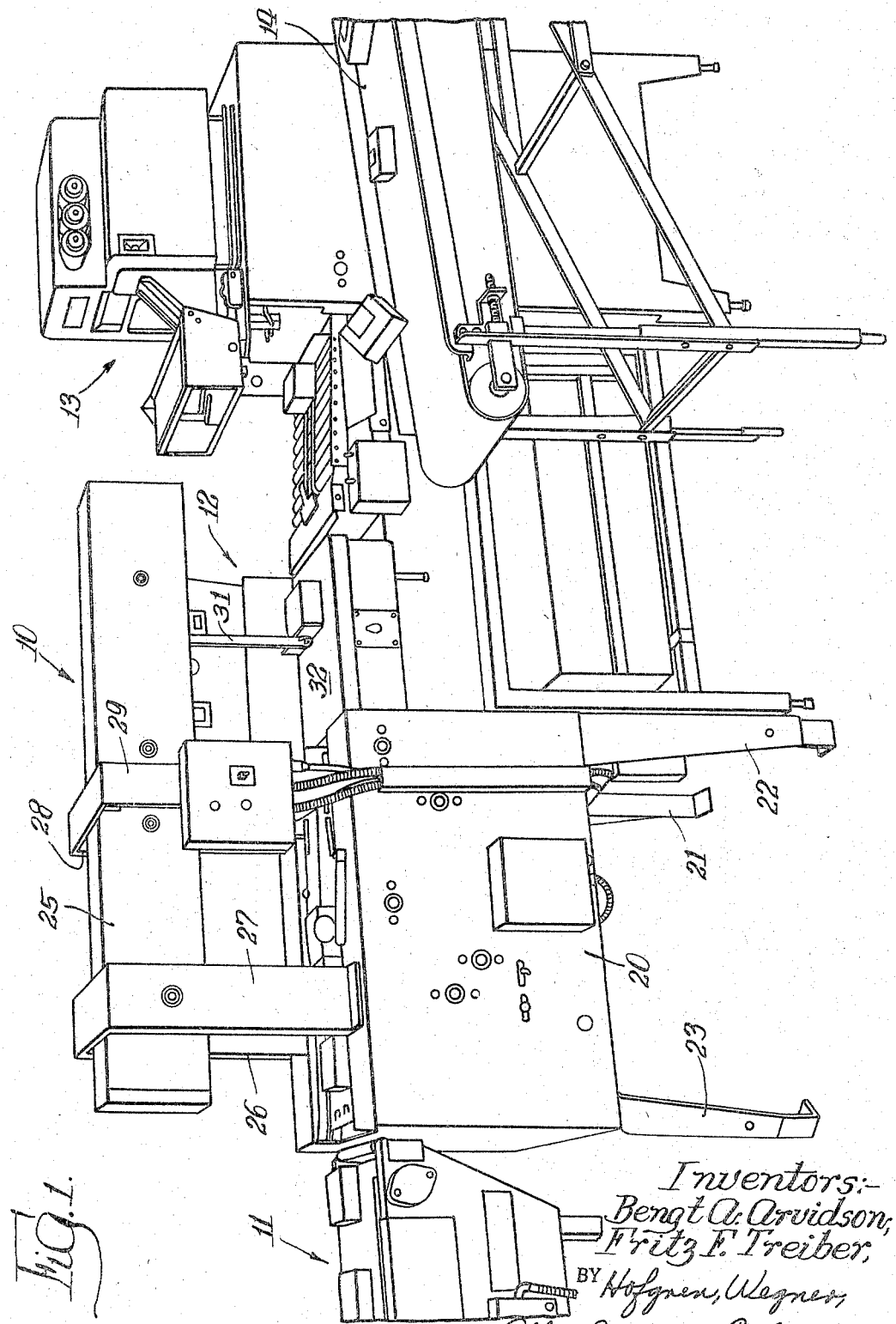

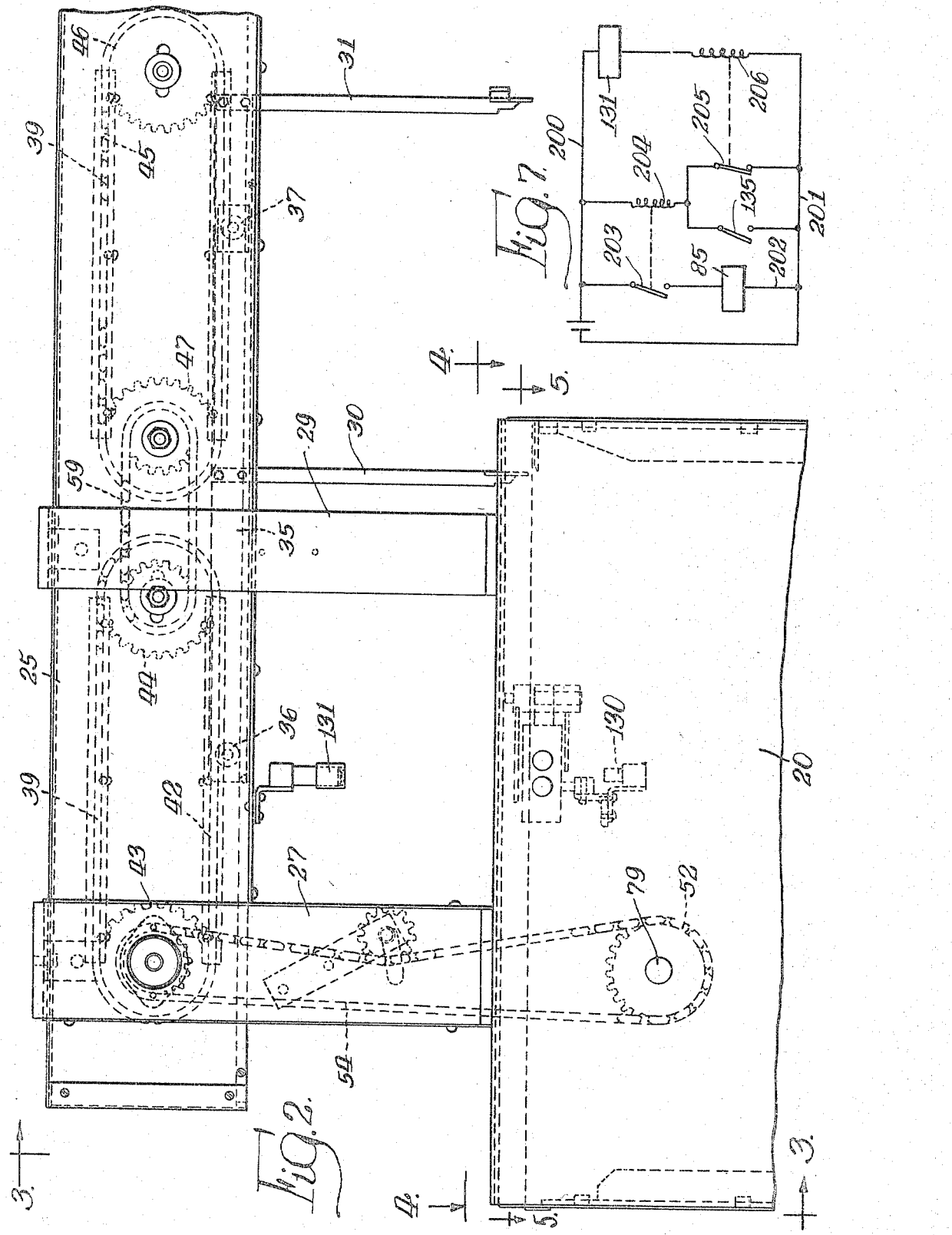

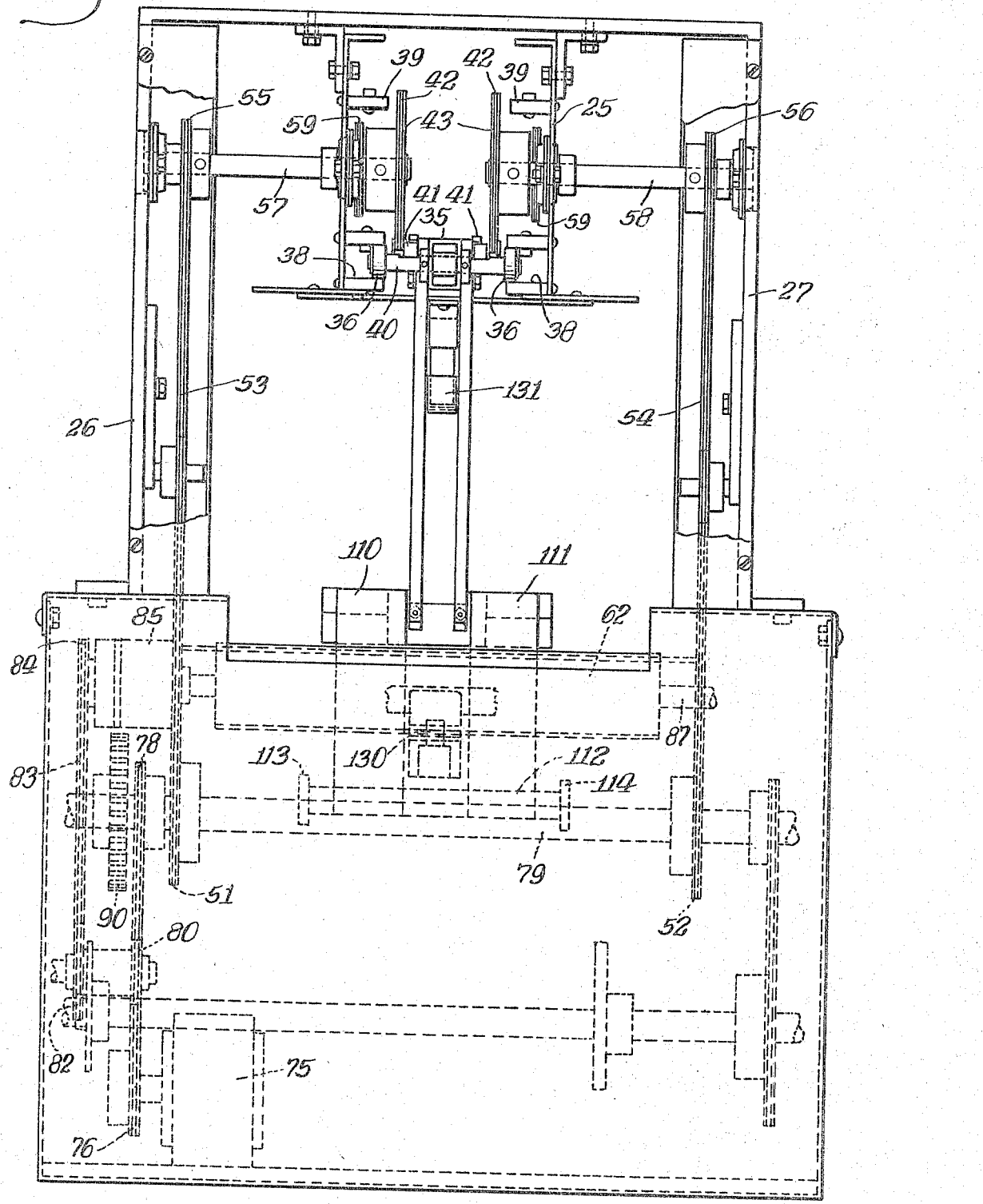

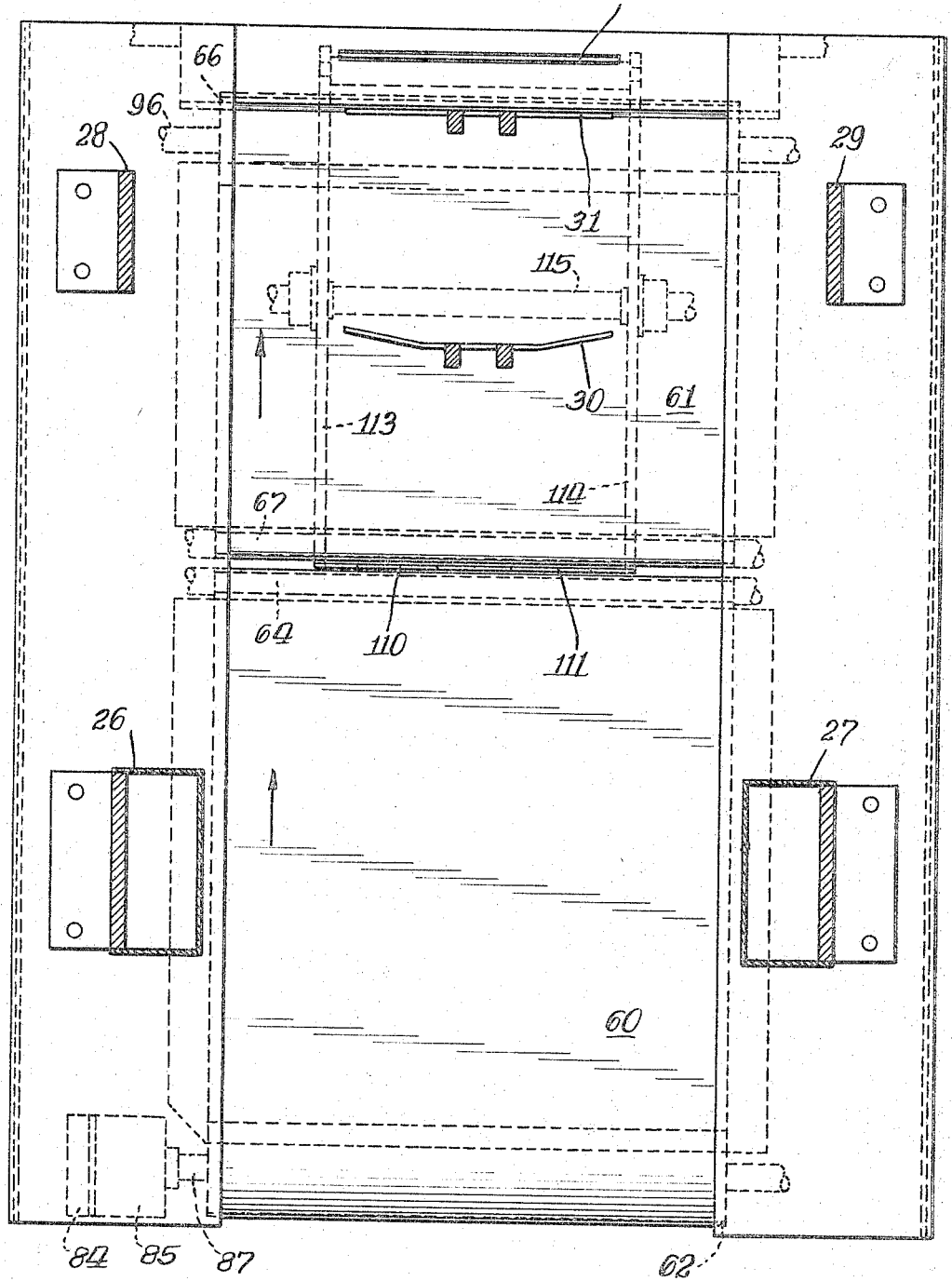

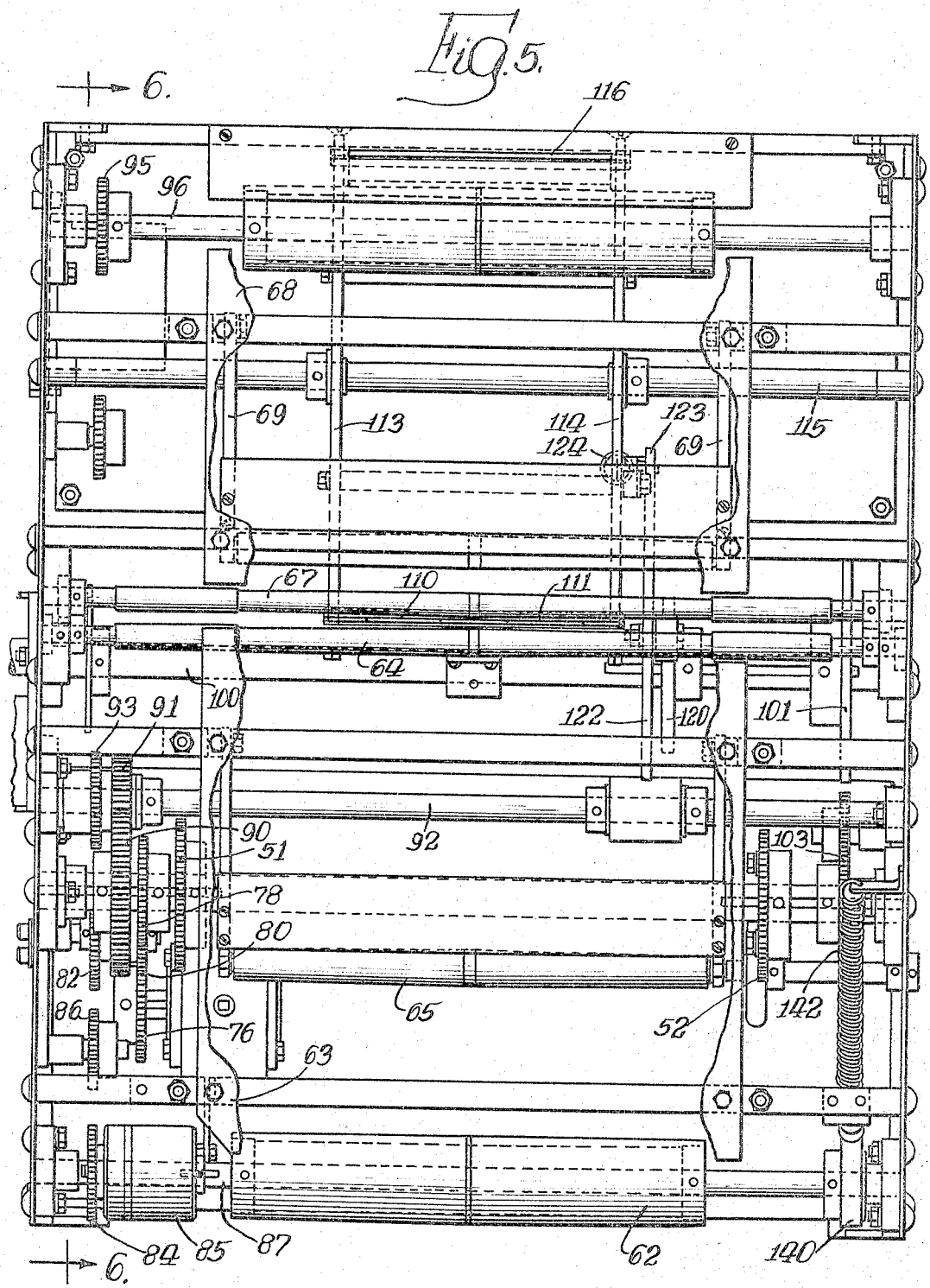

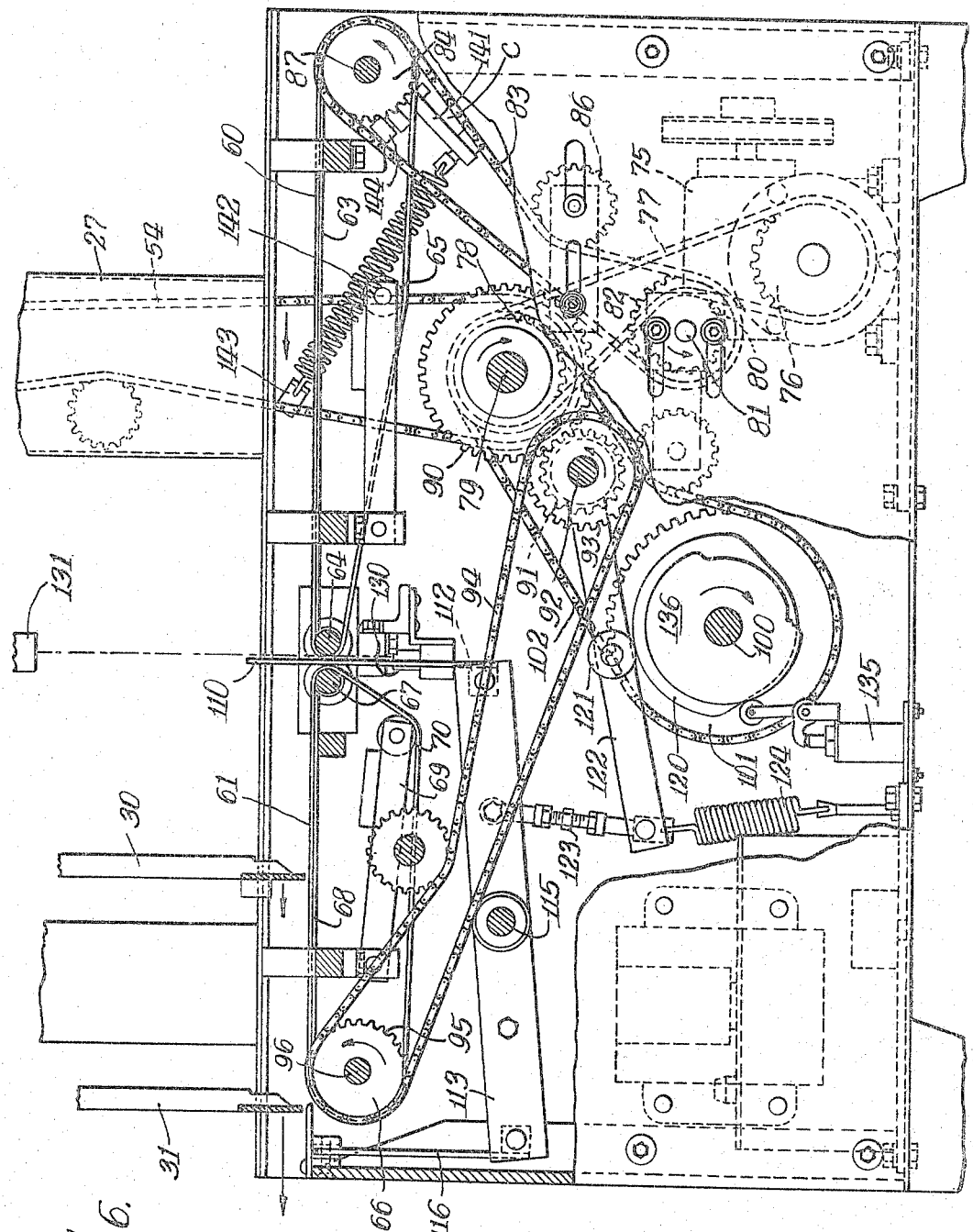

3,323,634
PACKAGE INDEXING MECHANISM
Bengt A. Arvidson, Villa Park, and Fritz F. Treiber, Niles, Ill., assignors to Corley-Miller, Inc., a corporation of Ohio
Filed Apr. 19, 1965, Ser. No. 449,098
10 Claims. (Cl. 198—34)

This invention relates to package handling mechanism and more particularly to mechanism for indexing successive packages.

Frequently, in connection with packaging of produce, cheese, or meats, a series of packages will be made and collected in gross in a container and subsequently it is desired to handle the packages individually and successively such as through a package weighing and labeling machine. A machine such as a package weighing and labeling unit must have a time interval between packages to perform the required functions with each package, and it is the function of the indexing device of this invention to provide controlled spacing between packages whereby a subsequent machine receives packages with a desired time interval therebetween.

An object of this invention is to provide a new and improved package indexing device.

Another object of the invention is to provide a package indexing device which can receive packages one after the other either in contact or at random spacing and whereby each package will be separated and advanced from a following package with a controlled time interval between discharge of successive packages from the indexing device.

Still another object of this invention is to provide an indexing device for packages which can handle a variety of intermixed package sizes intermittently passing through the indexing device.

A further object of the invention is to provide a package indexing device having first and second conveying means with the second conveying means traveling at a rate faster than the first conveying means whereby a package substantially supported by the second conveying means will travel at a faster rate than a package on the first conveying means and thus establish a controlled separation distance between adjacent packages.

A further object of the invention is to provide an indexing device as defined in the preceding paragraph in which a stop gate and package presence sensing device are located at a gap between said first and second conveying means with the gate functioning during a portion of a cycle to hold a succeeding package on the first conveying means and said sensing device sensing the passage of a trailing end of a package on the second conveying means past the location of the stop gate.

FIG. 1 is a perspective view of the indexing device shown in association with package wrapping weighing and labeling equipment and a package discharge conveyor;

FIG. 2 is a fragmentary side elevational view of the indexing device on an enlarged scale from that shown in FIG. 1;

FIG. 3 is an end elevational view taken generally along the line 3—3 in FIG. 2 and with upper end panels of the side frames broken away and a central end panel of the overhead conveyor mechanism removed;

FIG. 4 is a section taken generally along the line 4—4 in FIG. 2 and on an enlarged scale;

FIG. 5 is a section taken generally along the line 5—5 in FIG. 2 with chains removed and parts broken away;

FIG. 6 is a vertical section taken along the line 6—6 of FIG. 5; and

FIG. 7 is a schematic diagram of a simplified control circuit.

Referring to FIG. 1, the indexing device is indicated generally at 10 and is located between a package supplying unit indicated generally at 11 which can be the end of a wrapping machine or conveyor or a table preceding the indexing device for supplying packages at random to the indexing device. A package weighing scale indicated generally at 12 is adjacent the discharge end of the indexing device for receiving successive packages in timed space relation from the indexing device and measuring the weight thereof. The package is then conveyed to a labeling unit indicated generally at 13 which prints a label in accordance with the weight information obtained by the scale 12 and applies the label to the package with the package then being discharged onto a conveyor indicated generally at 14 for movement away from the equipment. The weighing scale and labeling system are disclosed in our co-pending application Ser. No. 200,608, filed June 1, 1962, now abandoned, and reference may be had thereto for a more detailed description of these mechanisms.

Further with reference to FIG. 1, the indexing device 10 embodies a lower frame 20 supported by a pair of rear legs 21 and 22 and a front centrally located leg 23. Located above the main frame 20 is an overhead conveying structure having a casing 25 supported from the frame 20 by a pair of spaced apart front legs 26 and 27 and a pair of rear legs 28 and 29.

The overhead conveying mechanism is shown particularly in FIGS. 2 and 3 and has a pair of movable paddle members 30 and 31 spaced along the length of package travel for conveying a package out of the indexing device onto a platform 32 of the scale 12 and advancing a preceding package from the platform 32 off thereof toward the labeling apparatus 13.

The overhead conveying mechanism is generally of the type disclosed in Arvidson Patent No. 2,981,043, granted Apr. 25, 1961. The conveying mechanism consists of a support bar 35 extending longitudinally of the machine and having pairs of guide rollers 36 and 37 located at the front and rear ends thereof, respectively, which ride in lower guide channels 38 and along upper rails 39. A rod 40 supporting the guide rollers 36 carries a pair of brackets 41 which connect the rod 40 to a pair of endless chains 42 which pass about front sprockets 43 and rear sprockets 44. The rear end of the guide bar 35 is similarly connected to chains one of which is indicated at 45 (FIG. 2), which pass about laterally spaced rear and front sprockets 46 and 47, respectively. The sprockets 43 which drive the sprocket chains 42 are driven from a power shaft 79 located within the frame 20. The shaft 79 has a pair of sprockets 51 and 52 engageable with chains 53 and 54, respectively, extending upward'y through the supporting legs 26 and 27 and engageable with a pair of sprockets 55 and 56. These latter sprockets are on the rotatable shafts 57 and 58, respectively, extending inwardly toward each other and having the sprockets 43 mounted on their inner ends within the casing 25 of the overhead conveyor mechanism. The drive from the chains 42 is transmitted to the sprockets 46 and 47 through an intermediate chain 59 as shown in FIG. 2, which engages sprockets on the shafts mounting sprockets 44 and 47.

In operation, the paddle members 30 and 31 are given a four-way motion from a lowered forward advanced position shown in FIG. 2 to an elevated position as the sprockets rotate in a counterclockwise direction as viewed in FIG. 2. In the elevated position the guide rollers 36 and 37 rest on the upper tracks 39 with the chains beneath the guide rollers. This is permitted by the rods 40 mounting the guide rollers 36 and 37 being rotatably mounted on the bar 35. The paddle members 30 and 31 then retract and descend downwardly as the guide rollers 36 and 37 move from the upper tracks 39 to the lower channels 38 to a position behind packages and then advance to the position shown in FIG. 2.

The timing and operation of the overhead conveyor mechanism will be referred to further after description of the spacing and indexing mechanism of the indexing device.

Referring particularly to FIGS. 1, 4 and 6, the indexing device has a front receiving end for packages with packages resting upon first endless belt 60 which carries packages to an intermediate stop position. Packages are advanced beyond the intermediate stop position by a second endless belt 61. As seen particularly in FIG. 6, the first belt 60 is mounted on a driven roller 62 at the entry end and extends along and over a support plate 63 to support the weight of a package and returns about a guide roller 64 adjacent the package stop position. A lever mounted roller 65 rests within the confines of the belt and engages the lower reach thereof to maintain the belt 60 under tension. The belt 61 passes about a driven roller 66 at the discharge end of the indexing device and also about a guide roller 67 adjacent the package stop position. This belt is positioned over a support plate 68 for holding the weight of a package. A pivoted lever having arms 69 supports a roller 70 resting on the lower reach of belt 61 to maintain the belt under tension.

The belts 60 and 61 are driven in a certain timed relation with the drive of the belt 60 being intermittent depending upon certain package conditions. The belt 61 travels at a greater speed than the belt 60 whereby as a package moves from the belt 60 to the belt 61, as moving from right to left in FIG. 6, a package on belt 61 or substantially thereon will progressively move away from a package supported entirely on belt 60.

The drive for the belts is derived from a motor and gear box unit 75 having a drive sprocket 76 driving a chain 77 extending about a sprocket 78 on a shaft 79 rotatably mounted on the frame. The chain 77 engages a sprocket 80 mounted on a stub-shaft 81 with the sprocket 80 being connected to a larger sprocket 82 on the same shaft which drives a chain 83 extending about a sprocket 84 on the input side of a magnetic clutch 85 for drive roller 62. The magnetic clutch 85 has its output shaft 87 connected to the drive roller 62 for the belt 60. A slack take-up idler sprocket 86 is mounted for taking up slack in the chain 83.

The shaft 79 has a gear 90 engageable with a gear 91 on a rotatable shaft 92, with shaft 92 also having a sprocket 93 engageable with a chain 94 extending to the front and passing about a sprocket 95 fixed to the shaft 96 mounting the guide roller 66 for the belt 61. The drive train for belt 61 is constructed to drive belt 61 faster than belt 60.

In order to complete the description of the drive mechanism, the drive for the rotatable camshaft 100 will now be described. The camshaft 100 has a sprocket 101 mounted thereon engaged by a sprocket chain 102 passing about a sprocket 103 (FIG. 5) on the shaft 79. The direction of rotation of the various shafts is shown by the arrows provided in FIG. 6.

All of the driven shafts are continuously rotated except for the shaft 87 driving the entering belt 60 which operates through the magnetic clutch 85. The magnetic clutch is under the control of two different elements subsequently to be described.

As previously described, a package stop position is defined by a space between the entering belt 60 and the exit belt 61. As shown particularly in FIG. 6, this space is occupied by a stop gate which as shown in FIGS. 3 and 6 is in the form of a pair of paddle members 110 and 111 mounted on a bar 112 carried by a pair of lever arms 113 and 114 pivotedly mounted on a shaft 115 extending between the sides of the frame. The arms 113 and 114 at their opposite end mount a stop plate 116 movable up through an opening in the top of the machine to block off the end of the indexing device at a proper time in the cycle. As shown in FIGS. 3 and 6, the paddle members 110 and 111 are in their raised position to block passage of a package from conveyor 60 onto conveyor 61. The paddle members are operated in timed relation with the remainder of the machine by a cam 120 mounted on the camshaft 100 which is engageable by the follower roller 121 on an arm 122 with the arm 122 connected through a link 123 to the lever arm 114. A spring 124 urges the follower roller 121 into engagement with the cam and urges the paddle members 110 and 111 downwardly as permitted by a low on the cam 120. As shown in FIG. 6, the paddle members 110 and 111 are elevated by the follower, 121 being on the high of cam 120 and moving to the low at the time when paddle members 30 have traveled the length of conveyor 61 and again are lifting away to return to pick up another package. After paddle member 30 has traveled back the length of belt 61 and moved down to pick up another package, the paddles 110 and 111 move up to block the travel of another package from belt 60. At this time, a limit switch 135, hereinafter referred to, is operated b ycam 136 to energize the electric clutch and start belt 60 rotating to feed another package against raised stop paddle members 110 and 111.

The paddle members 110 and 111 are spaced apart to provide space for a light source 130 which is located to direct light up through the space between the belts 60 and 61 and between the paddle members 110 and 111 onto a photocell 131. As shown in FIGS. 3 and 6, the photocell is above the package stop position and functions as an end-of-package detector and also indicates the presence of a package. The photocell 131, by means of a suitable circuit, is connected in series with the magnetic clutch 85 associated with the drive roller 62 for the belt 60. Also, in circuit with the magnetic clutch 85 is a limit switch 135 (FIG. 6) which is operable by a control cam 136 mounted on the camshaft 100. This limit switch 135 is in parallel with the cell 131 whereby either the limit switch or the cell may control the magnetic clutch 85. The limit switch 135 is operated to an open position when low of cam 136 is reached at a short interval after paddles 110 and 111 have reached their low position. This interval must be less than time to feed the shortest anticipated package past the electric eye light beam originating at the light source 130 and past the paddle members 110 and 111. The light beam from source 130 will remain interrupted and keep circuit closed to magnetic clutch 85 until a package has passed, when the light beam will cause photocell 131 to open circuit to magnetic clutch and stop the belt 60 and prevent the next package from following the first one. The pusher members 30 will come down to move the package away and cam 120 will lift paddle members 110 and 111 and cam 136 will actuate switch 135 closing the circuit to magnetic clutch for starting another cycle.

The drive pulley 62 for the entering belt 60 is at all times in engagement with a drag brake 140 shown in FIGS. 5 and 6, including means for yieldably exerting a drag on the shaft 87 of the roller 62. This drag results in a counter-clockwise rotation of an arm 141 against a stop C, shown in FIG. 6, against the action of a spring 142 secured at one end to the arm and at the other end to the frame by clip 153. Upon de-energization of the clutch 85, the spring 142 will take over upon release of the driving torque to rotate the arm 141 in a clockwise direction until a stop 144 is engaged, with the result that the top reach of belt 60 will be moved from left to right as viewed in FIG. 6 to move a package on belt 60 away from the stop position.

In operation, the stop paddles 110 and 111 descend and the stop plate 116 goes up when the overhead conveyed mechanism is returning to a retracted position. As the overhead conveying pusher member 30 descends to the rear of a package on the belt 61 held by the stop plate 116, the plate 116 descends and the paddle members 110 and 111 are elevated. The pusher member 30 moves a package off the belt and the pusher member 31 moves a preceding package, as off the scale platform 32 as shown in FIG. 1.

The control of the inlet belt 60 is obtained from both the limit switch 135 and the cell 131. A simplified control circuit is shown in FIG. 7. Opposite sides of a line are indicated at 200 and 201 with the electric clutch 85 connected across the line by line 202 having a switch 203 of relay 204 in the line. The relay 204 is connected across the line in series with limit switch 135 which is in parallel with a normally closed switch 205 of a relay 206. The relay 206 is connected across the line in series with the photocell 131. The limit switch 135, when closed, causes the clutch 85 to be energized. The cell 131 when not struck by light does not conduct so that switch 205 remains closed. Thus, when switch 135 opens, the clutch will remain energized if a package blocks the light to cell 131. When a package does not block the light, the cell 131 conducts to energize relay 206, open switch 205 and de-energize the clutch 85 unless cam operated switch 135 is closed.

A short interval after the paddle members 110 and 111 have descended, the limit switch 135 is open to condition the magnetic clutch 85 for de-energization. Whether or not the clutch is de-energized depends upon the position of a package relative to the cell 131. If there is no package blocking the light to the cell then the cell will function to energize the relay so that the clutch is de-energized with the result that the belt 60 stops and the drag unit 141 causes a slight retrograde movement of the belt so that there is no possibility of a package spanning the gap between the belts and in position for contact by the paddle members 110 and 111 as they are elevated.

Alternatively, if upon the opening of the limit switch 135 a package is across the path between the light and the cell 131, the cell 131 will remain dark and is connected in the circuit to keep the clutch 85 energized to keep belt 60 moving and feed a package from the belt 60 onto the belt 61. As soon as a package travels across the gap the cell 131 senses the light and immediately functions to de-energize the clutch 85 so that any succeeding package will be moved backward a slight distance to clear the gap so that the paddle members 110 and 111 subsequently can move upwardly. The selection of the time interval for paddle members 110 and 111 to be down is for a maximum desirable width of package, and after the paddle members 110 and 111 have gone up to block off an entering package, the limit switch 135 closes so that the clutch 85 is energized to convey a package against the paddle members and have the package held thereby until the paddle members subsequently descend.

With the foregoing structure it will be seen that a series of packages contacting each other can progressively enter the indexing device, and the belt 61 traveling at a speed faster than the belt 60 will create a space between succeeding packages which can be sensed by the cell 131 upon the passage of the trailing end of the leading package which will then cause stopping of the belt 60 and, in fact, slight rearward movement to assure that a package succeeding the initial package does not span the gap and be contacted by the paddle members 110 and 111 when they are subsequently elevated.

We claim:

1. A package indexing device for separating packages of different sizes comprising, a frame having an entry end and an exit end for packages, a first intermittently operable conveying means adjacent the entry end of the machine, a second conveying means spaced from said first conveying means less than a dimension of a package, means for driving said conveying means to pass successive packages through said device with said second conveying means having a greater speed than the first conveying means to obtain separation between successive packages, a disengageable clutch in said driving means to disengage the drive to said first conveying means, a light responsive member for detecting the presence or absence of a package in the space between said first and second conveying means, means for cyclically stopping the drive to said first conveying means by disengaging said clutch, means for delaying stopping of said drive if said light responsive member detects the presence of a package, and means for reversing the direction of travel of said first conveying means after disengagement of the clutch to insure that no package is in the space between said conveying means.

2. A package indexing device for separating packages of random sizes comprising, a first conveying means for advancing successive packages into said device, a second conveying means, with said conveying means being spaced from each other to define a package stop position therebetween, a package stop member mounted for movement between an operative position blocking the path of packages between said first and second conveying means and a retracted position, drive mechanism for driving said first and second conveying means, an electric clutch in the drive to said first conveying means, cyclically operable means including a cam for moving said stop member to and from said operative position, switch means operable in timed relation with said stop member moving means and in circuit with said clutch to energize said clutch when the stop member is in operative position, and package detecting means positioned at said package stop position for detecting the presence of a package and in circuit with said clutch and in parallel with said switch means whereby the presence of a package causes the clutch to be energized and the absence of a package causes de-energization of the clutch if said stop member is not in said operative position.

3. A package indexing device for separating packages of random sizes comprising, a frame, a first conveying means on said frame for advancing successive packages into said device, a second conveying means spaced from the first conveying means to define a package stop position therebetween, a package stop member movably mounted on said frame for movement between an operative position blocking the path of packages between said first and second conveying means and a retracted position, drive mechanism for driving said first and second conveying means with said second conveying means traveling at a faster rate than the first conveying means to obtain package separation, a clutch in the drive to said first conveying means, cyclically operable means for moving said stop member to and from said operative position, means operable in timed relation with said stop member moving means and in circuit with said clutch to engage said clutch when the stop member is in operative position, and package detecting means positioned at said package stop position for detecting the presence of a package and in circuit with said clutch whereby the presence of a package causes the clutch to be engaged and the absence of a package causes the clutch to be disengaged if said stop member is not in said operative position.

4. A package indexing device for separating packages of different sizes comprising, a frame, a first conveying means on said frame including an endless belt for advancing successive packages into said device, a second conveying means including an endless belt with said conveying means being spaced from each other to define a package stop position therebetween, a package stop member movably mounted on said frame for movement between an operative position blocking the path of packages between said first and second conveying means and a retracted position, drive mechanism for driving said first and second conveying means with said second conveying means traveling at a faster rate than the first conveying means to obtain package separation, an electric clutch in the drive to said first conveying means, cyclically operable means including a cam for moving said stop member to and from said operative position, switch means operable in timed relation with said stop member moving means and in circuit with said clutch to energize said clutch when the stop member is in operative position, package detecting means positioned at said package stop position for detecting the presence of a package including a light source and a light responsive member, said light responsive member being in circuit with said clutch and in parallel relation with said switch means whereby the presence of a package blocks the light and said light responsive member causes the clutch to be energized and the absence of a package causes the light responsive member to de-energize the clutch if said stop member is not in said operative position, and means for causing retrograde movement of said first conveying means upon de-energization of the clutch.

5. A package indexing device for spacing packages of random sizes comprising, a first conveyor, a second conveyor having its entry end closely spaced to the exit end of the first conveyor, means for driving the second conveyor, means for driving the first conveyor at a slower speed than the second conveyor, means positioned between said conveyors at a fixed location regardless of package length for detecting the passage of the end of a package past said space, and means responsive to said detecting means for stopping said first conveyor.

6. A package indexing device as defined in claim 5 further including package stop means intermittently positionable in said space for controlling the initial advance of a package from the first conveyor to the second conveyor, and means for positioning the stop means in said space after stopping the first conveyor.

7. A package indexing device as defined in claim 6 further including means for reversing the direction of travel of the first conveyor for a short distance after stopping thereof to make certain that a package does not overlie said space and block the path of said stop means.

8. A package indexing device for separating packages of different sizes comprising, a frame having an entry end and an exit end for packages, a first intermittently operable conveying means adjacent the entry end of the machine, a second conveying means spaced from said first conveying means less than a dimension of a package, means for driving said conveying means to pass successive packages through said device with said second conveying means having a greater speed than the first conveying means to obtain separation between successive packages, means for cyclically stopping the drive of said first conveying means, and means for detecting the presence of a package positioned across the space between said first and second conveying means to override said cyclical means and continue the drive of said first conveying means.

9. A package indexing device as defined in claim 8 in which said detecting means includes a light responsive member positioned to detect the presence or absence of a package across said space.

10. A package indexing device for obtaining separation between packages of varying sizes comprising, a first conveying means for advancing successive packages into said device, a second conveying means with a package stop position therebetween, drive mechanism for driving said first and second conveying means with said second conveying means traveling at a faster rate than the first conveying means to obtain package separation, clutch means in the drive to said first conveying means, package detecting means positioned at said package stop position for detecting the presence of a package including a light source and a light responsive member, and circuit means including said light responsive member and said clutch for maintaining the clutch energized when the presence of a package blocks the light and for de-energizing the clutch upon the absence of a package.

References Cited
UNITED STATES PATENTS

| | | | |
|---|---|---|---|
| 2,587,959 | 3/1952 | Biner | 198—32 |
| 3,024,890 | 3/1962 | Belk | 198—34 |
| 3,178,007 | 4/1965 | Standley | 198—34 |

EVON C. BLUNK, *Primary Examiner.*

MARVIN A. CHAMPION, A. C. HODGSON,
*Assistant Examiners.*